United States Patent [19]

Witherspoon et al.

[11] Patent Number: 5,314,766

[45] Date of Patent: May 24, 1994

[54] LEAD-ACID BATTERY ELECTRODE AND METHOD OF MANUFACTURE

[75] Inventors: Romeo R. Witherspoon, Shelby Township, Utica County; Armand R. Poirier, Sterling Heights, both of Mich.

[73] Assignee: General Motors Corporation, Detroit, Mich.

[21] Appl. No.: 963,172

[22] Filed: Oct. 19, 1992

[51] Int. Cl.$^5$ .............................................. H01M 4/46
[52] U.S. Cl. .................................... 429/227; 429/218; 429/225; 429/228; 423/559,619
[58] Field of Search ............... 429/218, 225, 227, 228; 423/559, 619

[56] References Cited

U.S. PATENT DOCUMENTS

| | | |
|---|---|---|
| 3,751,301 | 8/1973 | Kilduff . |
| 3,765,943 | 10/1973 | Biagetti . |
| 4,188,268 | 2/1980 | Sugahara et al. . |
| 4,218,527 | 8/1980 | Mellors . |
| 4,381,250 | 4/1983 | Rittenhouse . |
| 4,415,410 | 11/1983 | Reich ................................. 204/2.1 |
| 4,507,855 | 4/1985 | Moseley et al. . |
| 4,508,147 | 4/1985 | Moseley et al. ................. 429/225 X |
| 4,656,706 | 4/1987 | Mahato et al. . |
| 4,689,571 | 8/1987 | Yonezu et al. ....................... 324/432 |

OTHER PUBLICATIONS

Bode, Hans, Lead Acid Batteries, New York, John Wiley and Sons, 1977.

Primary Examiner—Prince Willis, Jr.
Assistant Examiner—M. Nuzzolillo
Attorney, Agent, or Firm—Lawrence L. Plant

[57] ABSTRACT

Positive plates are prepared by forming partially oxidized tetrabasic lead sulfate (4 $PbO_n \cdot PbSO_4$) having at least a part of the oxide ($PbO_n$) portion in the form of alpha lead dioxide ($\alpha - PbO_n$), and forming beta lead dioxide ($B-PbO_2$). Next the oxidized tetrabasic lead sulfate (OXYTTB) and the beta lead dioxide are intermingled in a wet mixture. The wet mixture is applied to the oxidized surface of a lead support substrate. Then, it is heated and pressed for a time and at a temperature and compressive load sufficient to form an adhered or retained coating of active material on the substrate. The OXYTTB is formed by reaction of tetrabasic lead sulfate with magnesium hydroxide and sodium persulfate. Preferably, beta lead dioxide is formed by reacting red lead oxide ($Pb_3O_4$) with nitric acid to provide an oxidation product, at least a major portion of which is beta $PbO_2$, and which has a surface area of at least 10 $m^2/gram$.

20 Claims, 3 Drawing Sheets

LEAD-ACID BATTERY ELECTRODE AND METHOD OF MANUFACTURE

FIELD OF THE INVENTION

This invention relates to positive electrodes of lead-acid batteries and to a method of their manufacture.

BACKGROUND OF THE INVENTION

Automotive type lead-acid batteries have interlaced positive and negative electrodes, also called plates. Each plate consists of special material, known as active material, supported on lead-alloy grids. The active material is formed from lead oxide pastes which are processed to a firm, porous form.

In the preparation of plates for a lead-acid battery, a mixture is formed containing oxides of lead, a significant amount of metallic lead, sulfuric acid, water and various other additives. As a result of chemical reaction during mixing, a portion of the mixture is initially converted to lead sulfate ($PbSO_4$), providing an active material precursor paste which includes lead and its oxides and sulfates.

The precursor paste is applied to conductive lead grids and the freshly pasted plates are then typically cured to stabilize the precursor material and to enhance the strength. Both positive and negative plates are made by the same basic process except for the selection of additives.

Negative plates are cured for up to three days in a high humidity warm air atmosphere to oxidize the free lead. Positive plates are cured by steam at near 100° C. for 3 hours. Plates are assembled in the battery and formed in a two-stage process which involves charging at a relatively high rate for 8 to 9 hours, until the temperature reaches 150° F. to 170° F. Batteries are then let stand for 2 to 3 hours and the charging completed at a lower current density for an additional 14 hours. This procedure normally results in plates which are in the range of 80 to 90% converted to metallic lead negatives and lead dioxide positives. The current process is highly dependent on timing and close control of the curing and charging stages. The charging process is also highly inefficient, requiring on the order of 250% of the calculated energy input to reach full charge.

Therefore, it is desirable to have a new type of active material for a lead-acid battery and a new process for forming plates with the new material.

SUMMARY OF THE INVENTION

There is provided a precharged positive electrode for a lead-acid battery, and a continuous process for making such precharged electrodes without curing and steaming steps. The electrode comprises a binder and an active material comprising at least about by weight at least partially oxidized tetrabasic lead sulfate (4 $PbO_n$ . $PbSO_4$) intermingled with up to about 50% by weight beta lead dioxide (B-$PbO_4$), wherein the oxide ($PbO_n$) portion of the tetrabasic lead sulfate is at least in part alpha lead dioxide ($\alpha$ - $PbO_2$). Desirably, at least about 20% by weight of the tetrabasic lead sulfate is alpha lead dioxide ($\alpha$ - $PbO_2$).

Preferably, the alpha lead dioxide constitutes about 20% to about 50% by weight of the tetrabasic lead sulfate. The beta lead dioxide (B-$PbO_2$) has a surface area of at least 12 square meters per gram. Desirably, the B-$PbO_2$ has a surface area of about 10 to about 30 and preferably about 15 to about 20 $m^2$/gram.

In one aspect of the invention, Positive plates are prepared by forming partially oxidized tetrabasic lead sulfate (4 $PbO_n$ . $PbSO_4$) having at least a part of the oxide ($PbO_n$) portion in the form of alpha lead dioxide ($\alpha$ - $PbO_n$), and forming beta lead dioxide (B-$PbO_2$). Next the oxidized tetrabasic lead sulfate and the beta lead dioxide are intermingled in a wet mixture. The wet mixture is applied to the oxidized surface of a lead support substrate. Then, it is heated and pressed for a time and at a temperature and compressive load sufficient to form an adhered or retained coating of active material on the substrate.

The step of oxidizing tetrabasic lead sulfate (4 $PbO_n$ . $PbSO_4$) achieved at least partial oxidization of the component $PbO_n$ (n primarily equal to one) to $PbO_2$. The at least partially oxidized tetrabasic lead sulfate is also referred to as peroxidized tetrabasic lead sulfate or OXYTTB. The OXYTTB is formed by reaction of tetrabasic lead sulfate (TTB) with magnesium hydroxide and sodium persulfate in an amount and at a temperature sufficient to form OXYTTB having at least about 40% by weight of alpha $PbO_2$. Alternatively, the OXYTTB is formed by reacting tetrabasic lead sulfate (TTB) with sodium hypochlorite and sodium hydroxide in an amount and at a temperature sufficient to form oxidized tetrabasic lead sulfate (OXYTTB) having at least about 40% by weight of alpha $PbO_2$ ($\alpha$ $PbO_2$).

The term "beta lead dioxide" refers to an oxidization product of partially oxidized lead (i.e. Pb/PbO, $Pb_2O_4$ (OX$Pb_3O_4$)) in which the major portion of the product is lead dioxide in the beta form (B-$PbO_2$). Lead dioxide ($PbO_2$) is polymorphous, B-$PbO_2$ is its tetragonal (rutile type) form, and a $\alpha$ $PbO_2$ is its rhombic (columbite type) form. Preferably, beta lead dioxide is formed by reacting red lead oxide ($Pb_3O_4$) with nitric acid in an amount and at a temperature sufficient to provide an oxidation product, at least a major portion of which is beta $PbO_2$, and which has the aforesaid surface area of at least 20 $m^2$/gram.

Preferably, before the mixture is applied to the substrate, a thermoplastic resin binder is intermingled with the tetrabasic lead sulfate and with the beta lead dioxide.

Preferably, the step of heating and pressing is conducted at a temperature of between about 125° C. and about 135° C., and at a compressive load of between about 2,000 psi and about 3,500 psi.

Objects, features, and advantages of the invention are a process for forming positive electrodes which are precharged for use in lead-acid batteries, a process which is economical, energy efficient, and suitable for mass-production of electrodes.

These and other objects, features and advantages will become apparent from the following description of the preferred embodiments, appended claims and accompanying drawings.

DETAILED DESCRIPTION OF THE PREFERRED EMBODIMENTS

Figure 1:
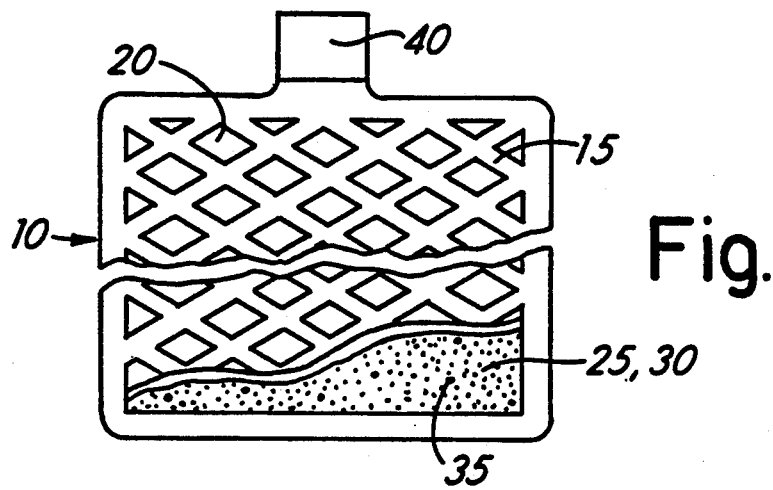
FIG. 1 is a schematic drawing of an electrode for a battery.

FIG. 1 shows a schematic drawing of a portion of an electrode 10 for use in a lead-acid battery. The electrode has a lead-based alloy substrate 15 which is in the form of a grid with recesses 20. The substrate grid 15 has surface oxides of lead. A coating 25, comprising an active material 30, is applied to the oxidized grid 15.

Several precharged positive electrodes 10 were made by the method of the invention using the active material 30 comprising partially oxidized tetrabasic lead sulfate and various beta lead oxides having differing surface areas. The following examples show the preparation of the oxidized grid surface 15 to which the active material 30 is applied; the preparation of an electrode 10 by hot-pressing active material 30 to the oxidized grid 15; and the preparation of the preferred oxidized tetrabasic lead sulfate, and beta lead dioxide components of the active material 30. The various materials and chemical reagents used in the examples are as shown in Table 1.

PART 1

Fabrication of Electrode Grid

Electrodes 10 were made using standard production grids 15 available from Delco-Remy. These grids 15 for positive electrodes 10 are of a 1% tin-0.07% calcium-lead alloy with a thickness of 0.043" (0.169 mm). Electrode grids of 10.7 cm$^2$ area were cut from full sized electrodes for testing. The production electrode grids 15 were subjected to treatments in order to produce an oxide coating 20 on the lead alloy grid 15, that is, a surface of $PbO_2$. The grids were first cleaned and then oxidized in a 1.35N NaOCl solution containing 3 grams/liter of NaOH for 2.5 minutes at 70° C. to 80° C.

In a second alternative, the grids were electrochemically oxidized in a 1M solution of $Na_2SO_4$ at 0.150 A/cm$^2$ for about 1 to about 3 minutes, then washed and dried. A similar electrochemical procedure utilized 37 weight percent sulfuric acid as the electrolyte.

PART 2

Electrode Fabrication

Figure 2:
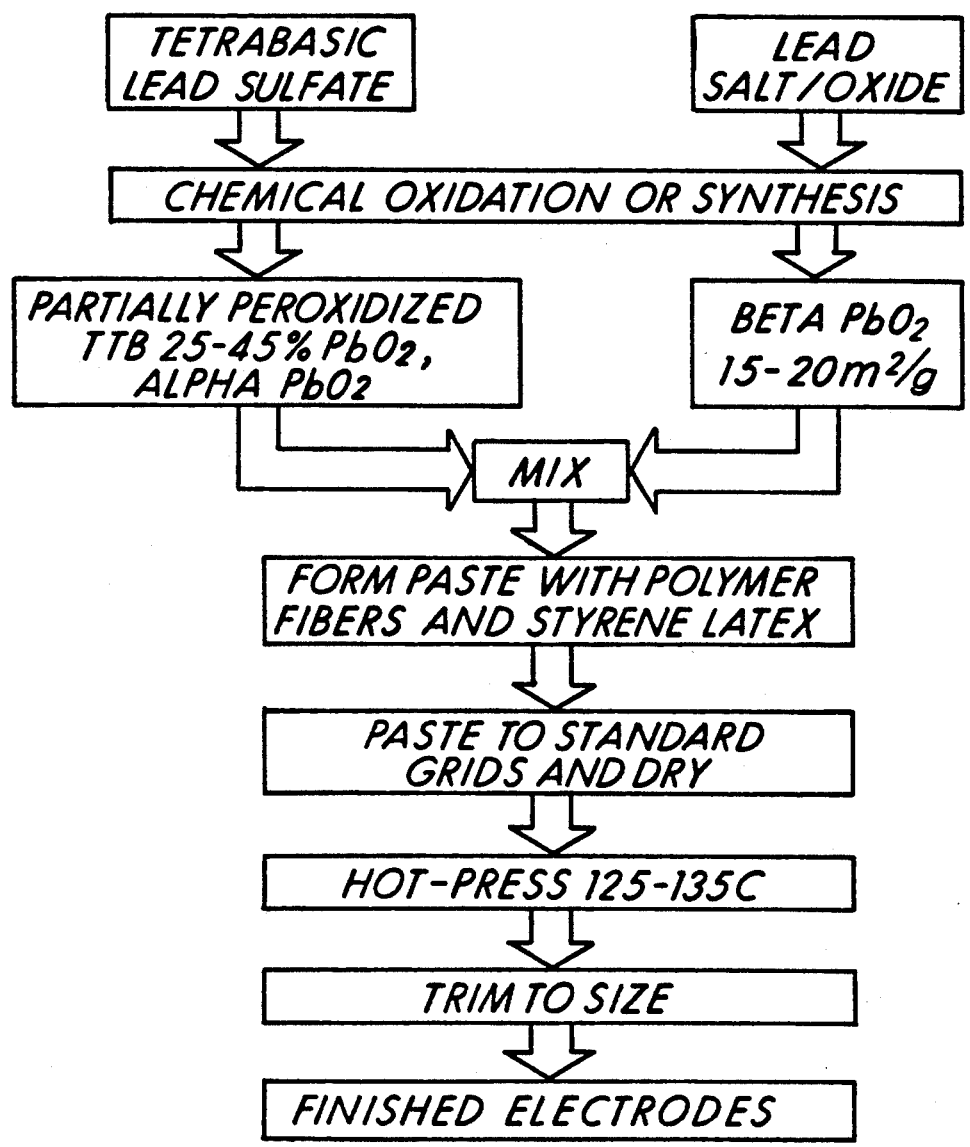
FIG. 2 is a flow diagram and schematic showing some of the important steps in producing the electrode of FIG. 2.

The general procedure (FIG. 2) for preparing electrodes includes preparing a coating 25 comprising an active material 30 and a binder 35. The binder 35 provides enhanced structural integrity and good adherence or retention of the active material 30 when hot-pressed and applied to the grid 15.

The basic steps include first preparing a 3 gram/100 ml $H_2O$ suspension of a wettable polyethylene fiber (binder) in a blender. A suitable wettable polyethylene binder is available from Crown-Zellerbach or Mini-Fibers Inc., and under the designation SWP-620. Next, a 9.8 gram sample of active material was prepared and added to a small plastic beaker. Then a sample of the polyethylene suspension weighing 6.6 grams was added to the active material in the beaker. This was followed by an addition of a styrene (binder) latex (50% solids) in the amount of 0.10 grams. A suitable styrene latex is available from Monsanto under the designation #5100. All the ingredients in the beaker were thoroughly mixed with a small spatula, and then stored in a small glass bottle.

The combination of ingredients may be prepared and immediately used or stored. The ingredients were applied to the oxidized metal grid 15 by adding 5 grams of the mixture (active material and binder), with approximately half being added to each side. A thin non-woven polypropylene sheet was used to support each half-sheet to be applied to the grid.

Excess liquid was removed from the mixture with absorbent paper toweling. The oxidized grid having the active material/binder mixture applied thereto, was wet-pressed at 3000 psi and dried for 15 minutes at 80° C. Next, it was hot-pressed at about 135° C. at 3000 psi for about 5 minutes. This essentially completed the formation of the electrode 10. Excess material was trimmed from the electrode and the capacity was calculated from the weight of the active material 30.

PART 3

Preparation of Partially Peroxidized Tetrabasic Lead Sulfate

Two basic methods were used to prepare the partially oxidized tetrabasic lead sulfate component of the active material. One was based upon the use of sodium persulfate and the other was based on the use of hypochlorite. The step of oxidizing tetrabasic lead sulfate (4 $PbO_n$ . $PbSO_4$) achieved at least partial oxidation of its $PbO_n$ (n primarily equal to one) to $PbO_2$. Prior to oxidation, $PbO_n$ constitutes primarily PbO (n=1), and preferably all $PbO_n$ has n=1. After oxidation, the $PbO_n$ component comprises a preferred amount of $PbO_2$ (n=2) in the alpha form primarily as an outer surface layer on the TTB crystals.

A. Sodium Persulfate Method 300 gram lots of partially oxidized tetrabasic lead sulfate were prepared by first forming a mixture of 1000 grams water, 51 grams Mg(OH) and 300 grams tetrabasic lead sulfate, and heating the mixture to 85° C. in a beaker with rapid stirring. Next, 150 grams sodium persulfate was gradually added to the mixture in the beaker, while the temperature rose to a range of between 95° C. to 97° C. This was maintained for approximately 20 minutes. Then, the pH of the mixture was adjusted to a range of 4 to 5 with sulfuric acid to dissolve any excess magnesium hydroxide. Excess liquid was decanted and the material in the beaker was vacuum washed several times to an essentially sulfate-free condition.

Finally, the mixture was dried at about 150° C. for 30 minutes and an analysis was conducted to determine the lead dioxide content of the product. It was determined that the partially oxidized tetrabasic lead sulfate product (OXYTTB) had a content of about 40 to about 50% by weight $PbO_2$ (lead dioxide) and demonstrated a resistance of 0.02 to 0.05 ohm-cm.

B. Hypochlorite Method

In this method, partially oxidized tetrabasic lead sulfate was prepared by first adding 1000 ml of commercial grade 10 weight percent sodium hypochlorite and 4.5 grams of sodium hydroxide to a beaker, and heating to about 70° C., while stirring rapidly. Next, 300 grams of tetrabasic lead sulfate was added to the hot mixture while stirring continued, and the reaction temperature rose to about 90° C. The reaction temperature was maintained in a range of about 85° C. to about 90° C. for about 20 to about 30 minutes, by the addition of cold water or ice. The reaction mixture was then permitted to settle and excess liquid was decanted, followed by the addition of sulfuric acid sufficient to decrease the pH to about 4. The product was then washed thoroughly to an essentially chloride-free condition. The product was dried, measured, and assayed as described above. The OXYTTB product of this method demonstrated a resistance of 0.01 to 0.03 ohm-cm, and had a lead dioxide content of about 35 to about 40%.

TABLE 1

| Reagent or Material | Materials Source |
|---|---|
| Sodium persulfate ($Na_2S_2O_8$) | FMC |
| Sodium hypochlorite (NaOCl) | Industrial bleach |
| Sodium hydroxide reagent | J. T. Baker |
| Magnesium hydroxide | EM Science |
| Sulfuric acid | J. T. Baker |
| Sodium sulfate | J. T. Baker |
| "Delox" lead oxide (PbO) | Delco-Remy standard |
| Tetrabasic lead sulfate (TTB) | Eagle Picher |
| OXYTTB = peroxidized TTB | Part 3 and Examples |
| Red lead oxide ($Pb_3O_4$) | J. T. Baker |
| Oxidized red lead oxide ($OXYPb_3O_4$) | Part 4 and Examples |
| SWP-620 polyethylene fiber | Crown-Zellerbach Mini-Fibers Inc. |
| #5100 styrene/acrylic latex | Monsanto Chem. Co. |
| Nitric acid ($HNO_3$) | J. T. Baker |
| Lead dioxide ($PbO_2$) | Eagle Picher |
| Medium, fast, very fast cure grades ($PbO_2$) | Eagle Picher |
| OXYPbO = oxidized PbO | Part 4 and Examples |

PART 4

Preparation of Beta Lead Dioxide from Lead Oxide Precursors

A. Beta Lead Dioxide from Oxidized $Pb_3O_4$ in Nitric Acid

As stated earlier, the term "beta lead dioxide" refers to an oxidization product of partially oxidized lead (i.e. Pb/PbO, $Pb_2O_4$ ($OXPb_3O_4$)) in which the major portion of the product is lead dioxide in the beta form ($B-PbO_2$). The product may also include residual PbO which stabilizes the product. Three basic methods were used to prepare the beta $PbO_2$, one relied on the use of nitric acid at reaction conditions which included high, medium, and low temperatures and various quantities of nitric acid.

A preferred form of beta lead dioxide was prepared using nitric acid which produced beta lead dioxide having a preferred surface area in the range of 15 to 25 $m^2$/gram. The preferred surface area was achieved after a few trials which are instructive regarding the concentration and temperature effects on surface area. In a first trial, 200 grams of red lead oxide ($Pb_3O_4$) were mixed with 400 grams of water and 125 grams of concentrated nitric acid, while rapidly stirring for about 20 minutes at a temperature of about 100° C. The red lead oxide had a surface area in the range of 1.00 to 1.50 $m^2$/gram. The product was washed nitrate-free and dried. The product was assayed and found to have a $PbO_2$ content of 96.5%, resistance less than 0.001 ohm-cm and a BET surface area of only 0.80 $m^2$/gram.

The same process was again attempted at 80° C. and 50° C. In each case, the $PbO_2$ content was somewhat less, the resistance was about the same, and the surface areas were, respectively, 3.8 $m^2$/gram at 80° C. and 39 $m^2$/gram at 50° C.

Based on these results, an optimal method was developed in which only 110 grams of nitric acid were used for each 200 grams of red lead oxide, and the temperature was maintained at about 100° C. The product was brown in color, demonstrated 86% $PbO_2$, a resistance of 0.0015 ohm-cm, and a surface area of about 22 $m^2$/gram. This surface area is within a desired range of about 10 to about 30 $m^2$/gram, and close to the most preferred range of about 15 to about 20 $m^2$/gram.

B. Beta Lead Dioxide from Partially Oxidized Lead Oxides

Another method was based upon either forming partially or fully oxidized leady oxide (PbO/Pb, obtained from Delco-Remy) or forming partially or fully oxidized red lead oxide ($Pb_3O_4$). By the use of a persulfate process as described in Part 3, subpart A, it was found that levels of oxidation ranged from a low of 5% to above 90%, depending on the amount of persulfate used.

Preferably, to obtain a fully oxidized material, persulfate is used in an amount about equal to, or slightly in excess of the amount of the starting C. Thermal Treatment of Oxidized $Pb_3O_4$ In a third method, beta lead dioxide was formed from fully oxidized red lead oxide ($Pb_3O_4$) by a thermal treatment. In this alternative, an active form of lead dioxide was obtained by first preparing lead dioxide ($PbO_2$) and then by heating it at a temperature of about 295° C. to about 300° C. in air for about 30 minutes, in order to convert the alpha form to the higher temperature stable beta form. This third alternative was found to be the least effective.

EXAMPLE 1

A partially oxidized tetrabasic lead sulfate having about 25 to about 30% by weight alpha lead dioxide ($\alpha$ $PbO_2$) was formed in accordance with the sodium persulfate method described in subpart A of Part 3 above. Beta lead dioxide ($B-PbO_2$), obtained from Eagle Picher Company, was beta lead dioxide with a surface area of 12 $m^2$/gram (Fast Cure, FC; Eagle Picher Company). This was in the preferred range of about 10 to about 15 $m^2$/gram. The partially oxidized tetrabasic lead sulfate (OXYTTB) was combined with the beta lead dioxide and a binder in the following proportions: 70% OXYTTB, 28% beta lead dioxide, and 2% binder. A wet mixture of these components was applied by hot-pressing to an oxidized electrode grid. The electrode was tested as described below and demonstrated about 5 to about 7% utilization. The percentage utilization is determined by comparing the delivered Ah (amphere-hour) with the theoretically available Ah.

It is thought that the lead oxide composition of the wet mixture (paste) remains essentially unchanged after it is applied to the grid, dried, and hot-pressed. The paste of a typical process has a composition which is changed after it is applied, cured, and steamed. Thus, the inventor provides a unique paste (active material precursor) which has a composition essentially the same as the unique active material of the invention.

COMPARATIVE EXAMPLE A

Figure 3:
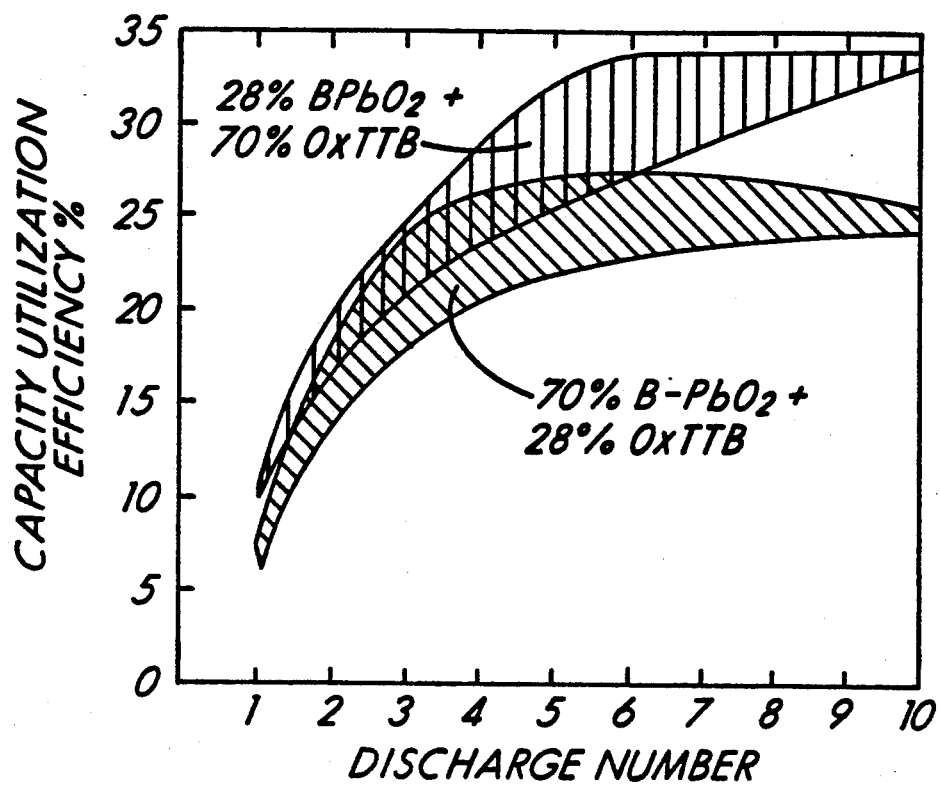
FIGS. 3, 4, and 5 are diagrams of capacity utilization efficiency as a function of battery cycles.

Method of Example 1 was used except that the electrode composition was changed to 70% beta lead dioxide, and 28% of the partially oxidized tetrabasic lead sulfate. This produced lower initial utilization and a lower maximum utilization with continued cycling, than did the electrodes of Example 1. (See FIG. 3).

EXAMPLE 2

The method of Example 1 was followed except that the electrodes were formed with beta lead dioxide $PbO_2$ having a surface area of 27 m$^2$/gram (Very Fast Cure, VFC); and the grids were vapor-blasted rather than chemically oxidized. This produced an electrode with an initial capacity of about 5% utilization. The cycling ability extended considerably to about 10 cycles before the capacity dropped below 10% utilization.

EXAMPLE 3

The method of Example 2 was used except that beta $PbO_2$ having a surface area of about 12 m$^2$/gram (Fast Cure, FC) was used in forming the electrode. The initial capacities fell within the same performance band of about 1 to about 7%, but the cycling properties were greatly improved, as can be seen from FIG. 4 where the electrodes formed from two types of beta $PbO_2$ are compared (12 m$^2$/g FC versus 27 m$^2$/g VFC). The test procedures used to evaluate performance are as follows.

Since the electrodes are intended for a precharged battery in which there is initial capacity without charging, the initial test always included a discharge at 0.20 A/cm$^2$. The discharge was carried out in sulfuric acid, with a specific gravity of 1.280, against two fully charged production lead negatives, each with an area four times that of the positive electrode. Test cells were either of an open beaker type or of a more conventional sandwich design. The discharge data was monitored by a computer program which recorded the discharge time to a cutoff voltage of 1.00V for the complete cell, as well as the potential of the positive versus a mercurous sulfate reference electrode. After each discharge, the test cells were recharged at constant current for 14 hours so as to input the theoretical capacity. In a few cases, the discharge current density was increased to 0.40 A/cm$^2$, which more closely approximates the current density used in starting automotive vehicles.

Figure 4:
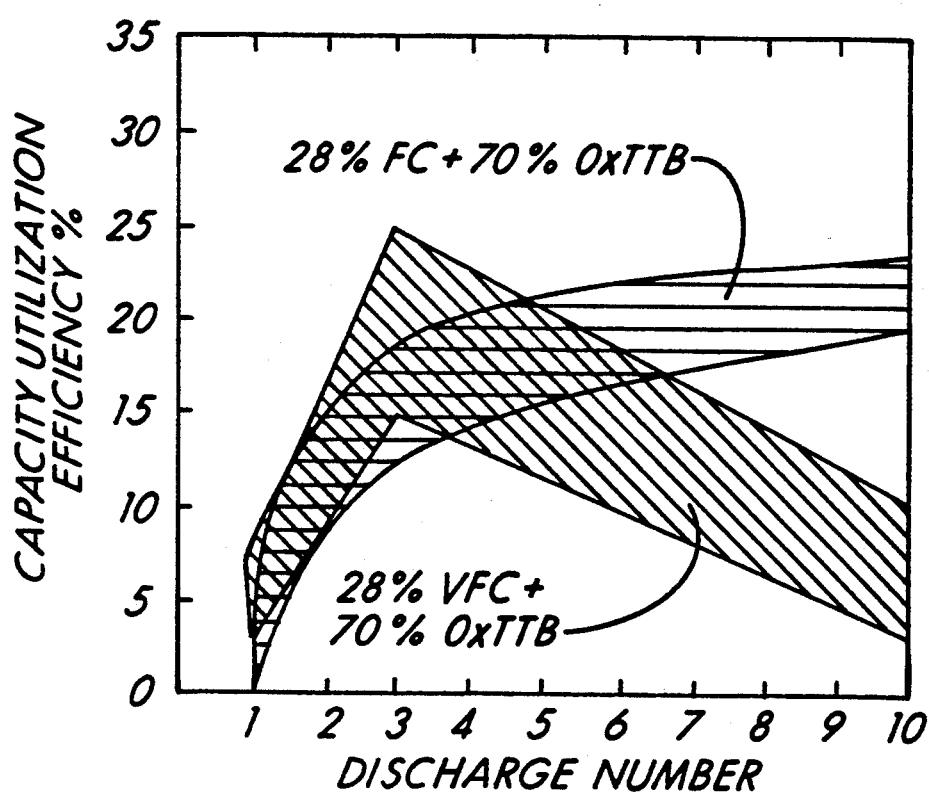

In comparing the electrodes of Examples 2 and 3, it can be seen that the electrodes of Example 2 reach a peak value at three cycles, whereas the electrodes of Example 3 continue to improve in capacity past ten cycles, and some electrodes were tested out to thirty cycles with good retention of properties. (FIG. 4). It is apparent from this data that the combination of a moderate surface area form of beta $PbO_2$, along with the stabilizing influence of the partially oxidized tetrabasic lead sulfate, is necessary for good cycling properties.

Figure 5:
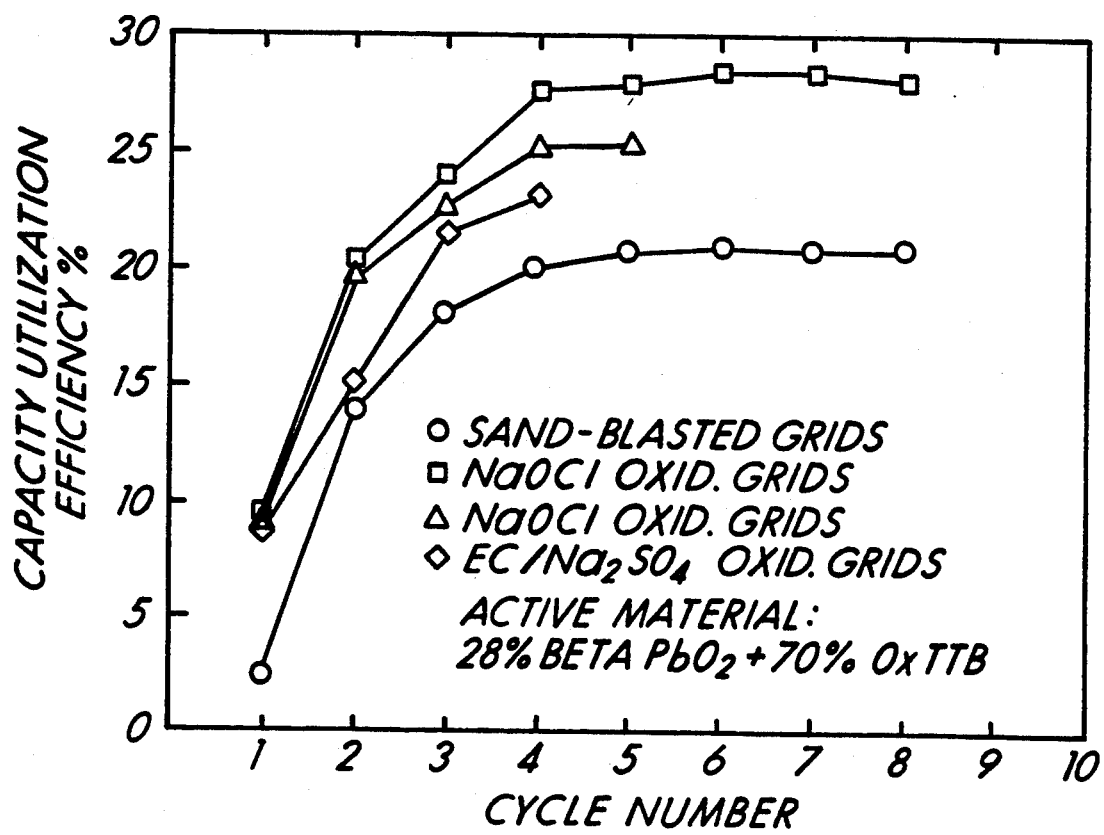

Tests were also conducted to determine the effect of various grid treatments. Some grids were first vapor-blasted and subsequently treated in sodium hypochlorite (1.35N) for a period of 16 hours, washed, and dried. Other electrodes were prepared by using the previously described electrochemical and chemical treatments of Part 1. FIG. 5 shows the effects of grid treatments on electrodes of fixed compositions. (70% partially oxidized tetrabasic lead sulfate by the hypochlorite method (subpart A of Part 3); and 28% beta $PbO_2$ from $Pb_3O_4$ by nitric acid method (Part 4). As can be seen from the data in FIG. 5, there is an improvement of at least 5% when the grid is oxidized to achieve a thin layer of $PbO_2$ on the grid surface before application of the active material.

Advantageously, the invention provides electrodes which deliver 10% utilization on the first discharge, and good cycling capability through the use of a $PbO_2$ coating on the grid; and an active material consisting of a relatively high surface area beta $PbO_2$ as a minor component, and a partially oxidized tetrabasic lead sulfate as the major component. A polyethylene fiber/styrene particle binder which constitutes about 2% by weight of the mixture of active material and binder, was found to produce acceptable results. These precharged electrodes are useful in automotive applications as they will deliver material utilizations of 10% and current densities in the 0.20 to 0.40 A/cm$^2$, and have good cycling properties under accelerated test conditions.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

We claim:

1. A pre-charged positive electrode comprising at least about 50% by weight at least partially oxidized tetrabasic lead sulfate (4 $PbO_n$ . $PbSO_4$) intermingled with beta lead dioxide (B-$PbO_2$), the beta lead dioxide being present in an amount up to about 50% by weight wherein the oxide ($PbO_n$) portion of the tetrabasic lead sulfate is at least in part alpha lead dioxide (alpha - $PbO_2$).

2. The a pre-charged positive electrode according to claim 1, wherein the active material comprises about 50% to about 80% by weight of the at least partially oxidized tetrabasic lead sulfate (4 $PbO_n$ . $PbSO_4$), about 20% to about 50% by weight of the beta lead dioxide (B-$PbO_2$), and wherein the alpha lead dioxide ($\alpha$ - $PbO_2$) constitutes at least about 30% by weight of the tetrabasic lead sulfate.

3. The a pre-charged positive electrode according to claim 2, wherein the alpha lead dioxide constitutes about 20 to about 50% by weight of the tetrabasic lead sulfate.

4. The a pre-charged positive electrode according to claim 1, wherein the beta lead dioxide has a surface area of at least 10 square meters per gram.

5. The a pre-charged positive electrode according to claim 1, further comprising a binder, intermingled with the active material, in an amount sufficient to enhance retention of the intermingled binder and active material on a support substrate.

6. The a pre-charged positive electrode according to claim 5, wherein the binder is a thermoplastic resin.

7. A lead-based pre-charged active material, comprising at least about 50% by weight at least partially oxidized tetrabasic lead sulfate (4 $PbO_n$ . $PbSO_4$) beta lead dioxide (B-$PbO_2$), the beta lead dioxide being present in an amount up to about 50% by weight wherein the oxide ($PbO_n$) portion of the tetrabasic lead sulfate is at least in part alpha lead dioxide (alpha - $PbO_2$).

8. The pre-charged active material of claim 7, wherein the active material comprises about 50% to about 80% by weight of the at least partially oxidized tetrabasic lead sulfate (4 $PbO_n$ . $PbSO_4$), about 20% to about 50% by weight of the beta lead dioxide (B-$PbO_2$), and wherein the alpha lead dioxide ($\alpha$ 0 $PbO_2$) constitutes at least about 30% by weight of the tetrabasic lead sulfate.

9. The pre-charged active material of claim 7, wherein the alpha lead dioxide constitutes about 20 to about 50% by weight of the tetrabasic lead sulfate.

10. The material or precursor therefor of claim 7, wherein the beta lead dioxide has a surface area of at least 10 square meters per gram.

11. The pre-charged active material according to claim 7, comprising a binder, intermingled with the active material, in an amount sufficient to enhance retention of the intermingled binder and active material on a support substrate.

12. The pre-charged active material according to claim 11 wherein the binder is a thermoplastic resin.

13. A method of making a positive plate for a lead-acid battery comprising:
    a) providing at least partially oxidized tetrabasic lead sulfate (4 $PbO_n \cdot PbSO_4$) at least a part of the oxide ($PbO_n$) portion of which is in the form of alpha lead dioxide ($\alpha$ - $PbO_2$);
    b) providing beta lead dioxide (B-$PbO_2$);
    c) intermingling the tetrabasic lead sulfate and the beta lead dioxide in a wet mixture;
    d) oxidizing the surface of a lead support substrate;
    e) applying the wet mixture of step (c) to the oxidized support substrate; and
    f) heating and pressing the applied wet mixture for a time and at a temperature and compressive load sufficient to form a coating and to retain the coating on the substrate.

14. The method according to claim 13, wherein the oxidized tetrabasic lead sulfate is formed by reacting tetrabasic lead sulfate with magnesium hydroxide and sodium persulfate.

15. The method according to claim 13, wherein the oxidized tetrabasic lead sulfate is formed by reacting tetrabasic lead sulfate with sodium hypochlorite and sodium hydroxide.

16. The method according to claim 13, wherein the beta lead dioxide is formed by reacting an oxide of lead a major portion of which is red lead oxide ($Pb_3O_4$) with nitric acid, in an amount and at a temperature sufficient to provide an oxidation product, the major portion of which is beta $PbO_2$, and which has a surface area of at least 10 $m^2$/gram.

17. The method according to claim 13, wherein before the step of applying the mixture, a thermoplastic resin binder is included in the mixture.

18. The method according to claim 13, wherein the step of heating and pressing is conducted at a temperature of between about 125° C. and about 135° C.

19. The method according to claim 13, wherein the step of heating and pressing is conducted at a compressive load of between about 2,500 psi and about 3,500 psi.

20. The method according to claim 13, wherein the beta lead dioxide and the oxidized tetrabasic lead sulfate are in a proportion to one another of about 20 to about 50 weight percent beta lead dioxide and about 50 to about 80 weight percent oxidized tetrabasic lead sulfate.

* * * * *